(12) United States Patent
Morman

(10) Patent No.: US 7,008,496 B2
(45) Date of Patent: Mar. 7, 2006

(54) ONE-STEP NECKED-BONDED LAMINATE PROCESS AND APPARATUS

(75) Inventor: Michael Tod Morman, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 29 days.

(21) Appl. No.: 10/320,322

(22) Filed: Dec. 16, 2002

(65) Prior Publication Data

US 2004/0112509 A1    Jun. 17, 2004

(51) Int. Cl.
*B32B 5/04*   (2006.01)
*B32B 31/08*  (2006.01)
*B32B 31/12*  (2006.01)

(52) U.S. Cl. .................. 156/167; 156/178; 156/229; 156/324

(58) Field of Classification Search .............. 156/167, 156/176, 178, 183, 229, 324
See application file for complete search history.

(56) References Cited

U.S. PATENT DOCUMENTS

| | | |
|---|---|---|
| 1,741,530 A | 12/1929 | Mayer |
| 2,574,200 A | 11/1951 | Teague |
| 3,047,444 A | 7/1962 | Harwood |
| 3,338,992 A | 8/1967 | Kinney |
| 3,341,394 A | 9/1967 | Kinney |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,333,979 A * | 6/1982 | Sciaraffa et al. ............ 428/179 |
| 4,340,563 A | 7/1982 | Appel et al. |
| 4,965,122 A | 10/1990 | Morman |
| 5,114,781 A | 5/1992 | Morman |
| 5,116,662 A | 5/1992 | Morman |
| 5,226,992 A * | 7/1993 | Morman .................... 156/62.4 |
| 5,244,482 A | 9/1993 | Hassenboehler, Jr. et al. |
| 5,336,545 A | 8/1994 | Morman |
| 5,382,461 A * | 1/1995 | Wu ............................ 428/86 |
| RE35,206 E | 4/1996 | Hassenboehler, Jr. et al. |
| 5,514,470 A | 5/1996 | Haffner et al. |
| 5,789,065 A | 8/1998 | Haffner et al. |
| 5,804,021 A | 9/1998 | Abuto et al. |

(Continued)

FOREIGN PATENT DOCUMENTS

EP    0 707 106 A1    4/1996

(Continued)

OTHER PUBLICATIONS

Zhuomin Ding and Joseph E. Spruiell: *Interpretation of the Nonisothermal Crystallization Kinetics of Polypropylene Using a Power Law Nucleation Rate Function*, J. Poly. Sci. B Polym. Phys., 35, pp. 1077-1098 (1997).

*Primary Examiner*—Sam Chuan C. Yao
(74) *Attorney, Agent, or Firm*—Pauley Petersen & Erickson

(57) ABSTRACT

A one-step method of making a necked-bonded laminate, wherein the layers of the laminate are formed and laminated within the same process. The method includes forming a nonwoven web, necking the nonwoven web, and immediately feeding the nonwoven web into a laminator where an elastomeric film is laminated to the nonwoven web. The elastomeric film may also be formed during the process prior to being fed into the laminator. Additionally, more than one nonwoven web may be formed and laminated to the elastomeric film during the process. The invention further includes apparatus for carrying out the one-step method.

38 Claims, 3 Drawing Sheets

U.S. PATENT DOCUMENTS

| | | |
|---|---|---|
| 5,853,881 A | 12/1998 | Estey et al. |
| 5,861,074 A | 1/1999 | Wu |
| 5,882,769 A | 3/1999 | McCormack et al. |
| 5,910,224 A | 6/1999 | Morman |
| 5,932,497 A | 8/1999 | Morman et al. |
| 5,993,589 A | 11/1999 | Morman |
| 6,015,764 A | 1/2000 | McCormack et al. |
| 6,028,240 A | 2/2000 | Wessel et al. |
| 6,037,281 A | 3/2000 | Mathis et al. |
| 6,051,177 A | 4/2000 | Ward |
| 6,096,668 A * | 8/2000 | Abuto et al. .............. 442/328 |
| 6,114,263 A | 9/2000 | Benson et al. |
| 6,129,801 A | 10/2000 | Bensen et al. |

FOREIGN PATENT DOCUMENTS

| | | |
|---|---|---|
| WO | 94/23947 | 10/1994 |
| WO | 96/19346 | 6/1996 |
| WO | 99/32700 | 7/1999 |
| WO | 00/16974 | 3/2000 |
| WO | WO 03/091491 A2 | 11/2003 |

* cited by examiner

A > B

ONE-STEP NECKED-BONDED LAMINATE PROCESS AND APPARATUS

BACKGROUND OF THE INVENTION

This invention is directed to a one-step method of manufacturing necked-bonded laminates, and apparatus for carrying out the method.

Conventional methods of manufacturing necked-bonded laminates include a two-step process, with a first step of making a spunbond web or other nonwoven web on a spunbond baseline or other nonwoven line and winding the nonwoven onto a roll. The second step is carried out after the nonwoven roll is delivered to the lamination site, at which point the nonwoven is unwound, necked, and laminated to an elastic film on the necked-bonded laminate line. Significant capital and material costs are expended in building and maintaining separate facilities for the nonwoven production and the necked-bonded laminate production lines, in addition to the costs of storing the nonwovens and transporting the nonwovens to the necked-bonded lamination facilities. Furthermore, transporting the nonwovens to the necked-bonded lamination facilities and setting up the nonwovens on the production line consumes a considerable amount of time and exposes the material to multiple handlings which can damage the material and increase yield loss.

Besides cost savings and efficiency, another area of current necked-bonded lamination production that has room for improvement is the finished product. It has been discovered that the neckability of nonwovens, spunbond in particular, decreases over time. Thus, from the time the nonwovens are manufactured and delivered to the necked-bonded lamination line at least some of their ability to be easily necked has dissipated.

There is a need or desire for a method of making necked-bonded laminates with reduced costs and increased efficiency, resulting in laminates with exceptional stretchability.

There is a further need or desire for apparatus for making necked-bonded laminates at a reduced cost and with increased efficiency, resulting in laminates with exceptional stretchability.

SUMMARY OF THE INVENTION

In response to the discussed difficulties and problems encountered in the prior art, a one-step method of manufacturing necked-bonded laminates, and apparatus for carrying out the method, have been discovered.

The method of the invention is a one-step, and one-location, method wherein one or more nonwoven webs is made and immediately fed into a necked-bonded lamination process. Nonwoven-forming processes and necked-bonded laminating processes are both high yield, continuous processes, and both require a considerable amount of uptime to carry out the processes. By combining the processes into a one-step process, a considerable amount of time and money can be saved.

In carrying out the method of the invention, filaments are bonded in a calender or other bonding device to form a nonwoven web, such as a spunbond web or meltblown web, for example. The nonwoven web is then necked and fed into a laminator where the nonwoven web is laminated to an elastomeric film. In this method, the nonwoven web is conveyed from the calender to the laminator within a span of 24 seconds. Additionally, the nonwoven web may be conveyed to a heating device prior to being fed into the laminator, and the nonwoven web may be necked totally or partially in the heating device.

The method may include the manufacture and lamination of one nonwoven web to an elastomeric film, or alternatively, may include the simultaneous manufacture and lamination of two nonwoven webs with the elastomeric film laminated therebetween. In an embodiment wherein two nonwoven webs are formed, necked, and laminated to an elastomeric film, both nonwoven webs are conveyed from calenders to the laminator within 24 seconds. Furthermore, one or both nonwoven webs can be conveyed to a heating device prior to being fed into the laminator, and may be necked totally or partially in the heating device.

The method of the invention may further include forming the elastomeric film prior to laminating the nonwoven web or webs to the elastomeric film. More specifically, while the nonwoven web or webs are being formed, necked, and conveyed to the laminator, the elastomeric film is simultaneously being formed and fed into the laminator.

"Green" spunbond, namely fresh spunbond, is easy to neck compared to spunbond that has been in storage. Therefore, very green (freshly made) spunbond can be necked a very high amount, potentially making laminates with over 300% stretch.

Apparatus for carrying out the method of the invention suitably includes a laminator, a nonwoven forming device for feeding a nonwoven web into the laminator, and a device for feeding a film into the laminator. A heating device may also be included. In another embodiment, wherein the apparatus is used to laminate two nonwoven webs to an elastomeric film, the apparatus suitably includes two nonwoven forming devices, and may optionally include one or two heating devices. In yet another embodiment, wherein the apparatus is used to simultaneously form an elastomeric film, the apparatus suitably includes a film die that feeds a film into the laminator. In another embodiment, a very wide nonwoven sheet can be formed, slit in half, necked, and fed into different sides of the lamination system. In still another embodiment, different widths of nonwoven can be formed and necked different amounts to end up with the same width of nonwoven going into the calender. The more highly necked facing will be softened more and be a little weaker than the facing that is not necked as much.

With the foregoing in mind, particular embodiments of the invention provide a method and apparatus for efficiently producing necked-bonded laminates having high stretchability potential.

DEFINITIONS

Figure 1:
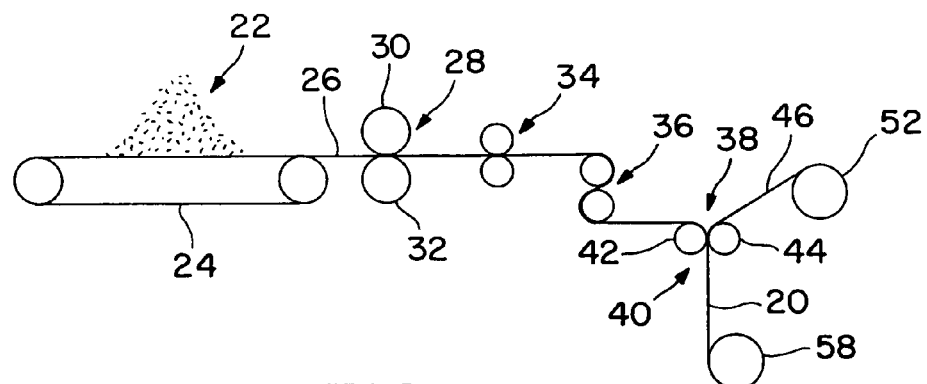
FIG. 1 is an illustration of an exemplary process for forming a necked-bonded laminate according to one embodiment of the invention.

Within the context of this specification, each term or phrase below will include the following meaning or meanings.

"Bonded" and "bonding" refer to the joining, adhering, connecting, attaching, or the like, of two elements. Two elements will be considered to be bonded together when they are bonded directly to one another or indirectly to one another, such as when each is directly bonded to intermediate elements.

"Elastomeric" or "elastic" refers to a material or composite which can be elongated by at least 60 percent of its relaxed length and which will recover, upon release of the applied force, at least 30 percent of its elongation. It is generally preferred that the elastomeric material or composite be capable of being elongated by at least 100 percent, more preferably by at least 300 percent, of its relaxed length and recover, upon release of an applied force, at least 50 percent of its elongation. For example, a 1-inch sample stretched 100% to 2 inches and returning to 1.5 inches upon release of the applied force recovers 50% of its elongation.

"Film" refers to a thermoplastic film made using a film extrusion and/or forming process, such as a cast film or blown film extrusion process. The term includes apertured films, slit films, and other porous films which constitute liquid transfer films, as well as films which do not transfer liquid.

"Interfiber bonding" refers to bonding produced by entanglement between individual fibers to form a coherent web structure without the use of a separate thermal bonding step. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of a fibrous web. For example, powdered bonding agents and chemical solvent bonding may be used.

"Meltblown fiber" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface. Meltblown fibers used in the present invention are preferably substantially continuous in length.

"Necked-bonded laminate" refers to a material having an elastomeric film joined to a necked material at least at two places. The elastomeric film may be joined to the necked material at intermittent points or may be completely bonded thereto. The joining is accomplished while the elastic sheet and the necked material are in juxtaposed configuration. The composite elastic necked-bonded material is elastic in a direction generally parallel to the direction of neckdown of the necked material and may be stretched in that direction to the breaking point of the necked material. A necked-bonded laminate may include more than two layers. For example, the elastomeric film may have necked material joined to both of its sides so that a three-layer necked-bonded laminate is formed having a structure of necked material/elastomeric film/necked material. Additional elastomeric films and/or necked material layers and/or inherently extendable layers may be added. Other combinations of elastomeric films and necked materials may also be used.

"Necked material" or "necked nonwoven" refers to any material or nonwoven which has been narrowed in at least one dimension by application of a tensioning force.

"Nonwoven" or "nonwoven web" refers to materials and webs of material having a structure of individual fibers or filaments which are interlaid, but not in an identifiable manner as in a knitted fabric. The terms "fiber" and "filament" are used interchangeably. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns or denier. (Note that to convert from osy to gsm, multiply osy by 33.91.)

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Spunbond fiber" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

These terms may be defined with additional language in the remaining portions of the specification.

DESCRIPTION OF PREFERRED EMBODIMENTS

The present invention is directed to a one-step method of efficiently producing necked-bonded laminates. In this single-step method, one or more nonwoven webs are formed and fed into a laminator where the nonwoven web or webs are laminated to an elastomeric film which may either be pre-formed or may also be formed within the same process.

Referring to FIG. 1, there is shown an embodiment of the method of producing a necked-bonded laminate 20. More specifically, as shown, filaments 22 are substantially randomly deposited onto a forming belt 24 to form a nonwoven web 26, in a manner conventionally used to form nonwoven webs as known to those skilled in the art. The nonwoven web 26 may be made of filament-forming polymers such as, for example, polyolefins. Exemplary polyolefins include one or more of polypropylene, polyethylene, ethylene copolymers, propylene copolymers, and butene copolymers. The filaments 22 may be meltblown fibers, spunbond fibers, bi-component fibers, sheath-core fibers, side-by-side fibers, or any other suitable type of filaments.

As the filaments 22 are deposited on the forming belt 24, a vacuum unit may be positioned under the forming belt to draw the filaments towards the forming belt during the formation of the nonwoven web 26. The filaments can be joined by interfiber bonding to form a coherent web structure which is able to withstand necking. Interfiber bonding may be produced by entanglement between individual, often heat softened or tacky, meltblown fibers. The fiber entangling is inherent in the meltblown process but may be generated or increased by processes such as, for example, hydraulic entangling or needlepunching. Alternatively and/ or additionally a bonding agent may be used to increase the desired bonding. The material can then be necked and laminated.

As the nonwoven web 26 is formed, the web is passed through a bonding device, such as a calender 28, including a calender roller 30 and an anvil roller 32, to bond the filaments 22 for further formation of the web. While the anvil roller 32 is suitably smooth, the calender roller 30 may be smooth but is preferably patterned to add a bond pattern to the web. Examples of suitable bond patterns include pin embossing or a sinusoidal bonding pattern. One or both of the calender roller 30 and the anvil roller 32 may be heated and the pressure between these two rollers may be adjusted by well-known means to provide the desired temperature, if any, and bonding pressure to form the nonwoven web 26. The calender 28 can also function as a nip for necking the web. Generally speaking, a nip is an area located between two rolls in close proximity.

After passing through the calender 28, the web 26 is fed into a laminator 38. The laminator 38 can also function as a downstream nip for necking the web, such that the web is necked between the calender 28 and the laminator 38 by the faster rotation of the laminator rolls. Alternatively, one or more separate nips, or pairs of S-rolls, may be included in the process between the calender 28 and the laminator 38, functioning as a first nip 34 and a downstream nip 36 to neck the web in any chosen section between the calender 28 and the laminator 38. By adjusting the difference in the speeds of the rollers, the nonwoven web 26 is tensioned so that it necks a desired amount and is maintained in the tensioned, necked condition as the web is fed into the laminator 38.

Other methods of tensioning the nonwoven web 26, besides conventional necking, may be used such as, for example, tenter frames or other cross-machine direction stretcher arrangements that expand the nonwoven web in other directions such as, for example, the cross-machine direction so that, after bonding to the elastomeric film, the resulting necked-bonded laminate will be elastic in a direction generally perpendicular to the direction of necking, i.e., in the machine direction.

At the laminator 38, pressure is applied to bond the tensioned, necked material to a rolled out or extruded elastomeric film 46 thereby forming a necked-bonded laminate 20 which can be wound up on a wind-up roll 58. Conventional bonding techniques, such as thermal bonding, ultrasonic bonding, and/or adhesive bonding, with either total bonding as occurs during extrusion coating or point-bonding possible, can be used to bond the elastomeric film 46 to the nonwoven web 26. In one embodiment of the invention, the nonwoven web 26 and elastomeric film 46 are introduced into the nip of a pressure roll arrangement 40. A gap or a controlled gap refers to a nip with a measurable space between the rollers. For purposes of the present invention, a pressurized gap refers to a nip set up such that the rolls are essentially in contact in the absence of material (passing between the rolls).

The pressure roll arrangement 40 may include at least a first pressure roll 42 and a second pressure roll 44 which can be set to define a controlled gap between the rolls. For example, the gap setting between the pressure rollers 42, 44 may be at about 15 mils to about 100 mils, or at about 20 mils to about 50 mils, or at about 25 mils to about 30 mils. Desirably, one or both of the pressure rolls may be chilled. For example, one or both of the pressure rolls may be chilled to temperatures of 55 to 50 degrees Fahrenheit or less. Chilling the pressure rolls is believed to help cool the extruded polymer film so it more rapidly "sets" in bonding contact with the tensioned, necked nonwoven web.

The nonwoven web 26 is conveyed from the calender 28 to the laminator 38 within a span of about 24 seconds, or within about 18 seconds, or within about 12 seconds. This time span can be calculated by dividing the distance from the calender to the laminator by the speed at which the nonwoven web is being conveyed. The maximum time span would be the maximum distance from the calender to the laminator divided by the minimum speed. For example, if the distance from the calender to the laminator is 160 feet (49 meters) and the minimum speed is about 400 feet per minute (122 meters per minute), the time it would take for a nonwoven web to be conveyed from the calender to the laminator would be 0.4 minutes, or 24 seconds.

The reason so little time is allowed between formation of the web and subsequent incorporation of the web into the necked-bonded laminate is that the crystallization of the nonwoven web rapidly occurs. The more crystalline a nonwoven material, the more brittle it becomes and the harder to neck. Also, the less the material can be necked before it breaks. Thus, in order to create a laminate having high potential stretchability, it is necessary to form the laminate before the nonwoven web is substantially crystallized. More specifically, polypropylene has a crystallization half-life at 27 degrees Celsius of about 12 seconds. Therefore, after about 24 seconds at 27 degrees Celsius, polypropylene reaches 75% of final crystallization. By necking and laminating the nonwoven web prior to near-complete crystallization, the nonwoven web can be necked a greater amount and with less breakage at a given necking level than substantially crystallized nonwoven webs. Since the green nonwoven web can be necked to a greater extent than nonwoven webs that are not as fresh, if the green nonwoven web is necked and laminated to an elastomeric film, the resulting necked-bonded laminate will consequently have greater stretchability than necked-bonded laminates made with non-green nonwoven webs or even laminates that are only a day or so old. A more detailed explanation of the crystallization kinetics of polypropylene is provided in the article "Interpretation of the Nonisothermal Crystallization Kinetics of Polypropylene Using a Power Law Nucleation Rate Function," by Zhuomin Ding and Joseph E. Spruiell, published in J. Poly. Sci. B Polym. Phys., 35, 1077 (1997).

Figure 2:
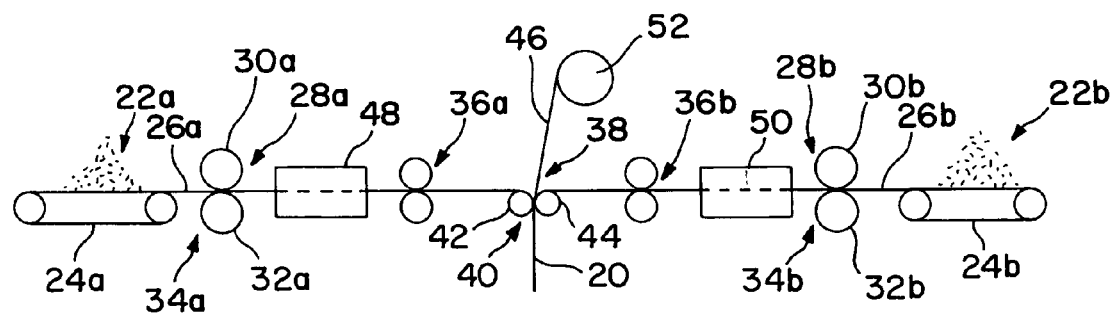
FIG. 2 is an illustration of an exemplary process for forming a necked-bonded laminate according to another embodiment of the invention.

In another embodiment, shown in FIG. 2, two nonwoven webs 26a, 26b are simultaneously formed, necked, and bonded to opposite sides of the elastomeric film 46. Both of the nonwoven webs 26a. 26b can be the same, or each web can be different. For example, each web may be made up of the same or different types of filaments, and/or the calender rollers 30a, 30b in each nonwoven line can have the same or different types of bond patterns such as one bond pattern that provides strength and another bond pattern that provides softness. Furthermore, the nonwovens may differ in terms of different polymers, basis weights, fiber size, fiber type, shape, and the like. As mentioned with respect to FIG. 1, the calender 28 can function as a first nip, and the laminator 38 can function as a downstream nip. A separate downstream nip 36a, 36b is shown in both of the nonwoven forming lines. In addition, an optional heating device 48, 50, such as an oven, is also shown in both of the nonwoven forming lines of this embodiment. Such a heating device would also be suitable for use in the embodiment shown in FIG. 1. Necking of the nonwoven webs 26a, 26b can be carried out within the heating devices 48, 50. Optionally, different widths of nonwoven can be formed and necked different amounts to end up with the same width of nonwoven fed into the calender. The more highly necked facing will be softened more and be a little weaker than the facing that is not necked as much. As in the embodiment illustrated in FIG. 1, both nonwoven web lines in this embodiment convey the nonwoven webs 26a, 26b from the calender 28a, 28b to the laminator 38a, 38b within a span of about 24 seconds, or within about 18 seconds, or within about 12 seconds.

The nonwoven webs 26 can be any suitable nonwoven that can be formed and immediately fed into the laminator 38, in accordance with the invention. For example, suitable types of nonwoven webs include spunbond webs and meltblown webs. In one embodiment, the nonwoven web may be a multi-layer material having, for example, at least one layer of spunbonded web joined to at least one layer of meltblown web, or other suitable material. For example, the nonwoven web may be a multi-layer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy. Alternatively, the nonwoven web may be a single layer of material such as, for example, a spunbonded web having a basis weight of from about 0.2 to about 10 osy or a meltblown web having a basis weight of from about 0.2 to about 8 osy. The line speed required to make 0.4 to 0.5 osy (basis weight before necking) nonwoven facings matches up well with the speed desired for the lamination process of the invention. Conventional bonding techniques, such as thermal bonding, hydroentangling, and ultrasonic bonding, can be used to form the nonwoven web.

In one embodiment, rather than forming the two nonwoven webs separately, a single, wide, nonwoven sheet can be formed, slit in half, necked, and then fed into different sides of the lamination system.

The nonwoven web can be treated prior to lamination with the elastomeric film to flatten out the cross-directional necking profile or to reduce or control a virtual nip, for example. More specifically, the necked nonwoven web can be slit and/or apertured.

Figure 3:
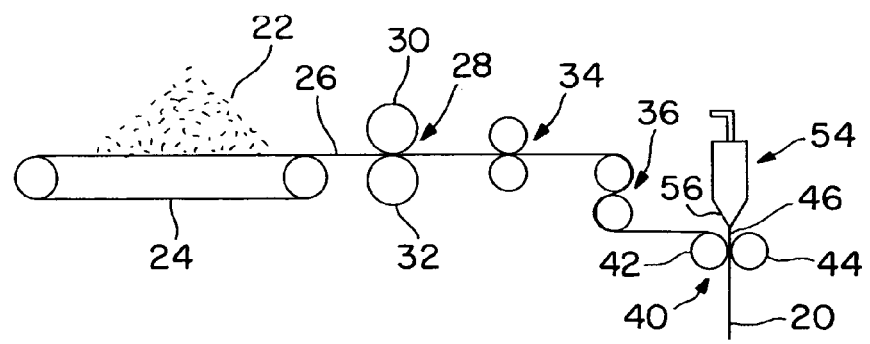
FIG. 3 is an illustration of an exemplary process for forming a necked-bonded laminate according to yet another embodiment of the invention.
Figure 4:
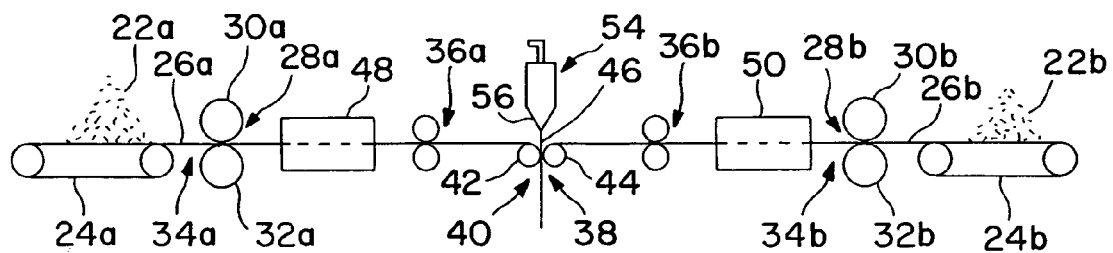
FIG. 4 is an illustration of an exemplary process for forming a necked-bonded laminate according to still another embodiment of the invention.

The elastomeric film 46 can be either a pre-formed film, fed from a storage roll 52 into the laminator 38, as shown in FIGS. 1 and 2, or can be formed on-site and extruded into the laminator, as shown in FIGS. 3 and 4. FIGS. 3 and 4 are essentially the same as FIGS. 1 and 2, respectively, with the exception of the film 46 being formed on-site and fed from an extruder 54 through a film die 56 into the laminator 38 in FIGS. 3 and 4.

The elastomeric film 46 can be made from any suitable elastomeric film-forming resins or blends containing the same. For example, materials suitable for use in preparing the elastomeric film include diblock, triblock, tetrablock, or other multi-block elastomeric copolymers such as olefinic copolymers, including styrene-isoprene-styrene, styrene-butadiene-styrene, styrene-ethylene/butylene-styrene, or styrene-ethylene/propylene-styrene, which may be obtained from Kraton Polymers, under the trade designation KRATON elastomeric resin; polyurethanes, including those available from E. I. Du Pont de Nemours Co., under the trade name LYCRA polyurethane; polyamides, including polyether block amides available from Ato Chemical Company, under the trade name PEBAX polyether block amide; polyesters, such as those available from E. I. Du Pont de Nemours Co., under the trade name HYTREL polyester; and single-site or metallocene-catalyzed polyolefins having density less than about 0.89 grams/cubic centimeter, available from Dow Chemical Co. under the trade name AFFINITY.

A number of block copolymers can also be used to prepare the elastomeric film used in this invention. Such block copolymers generally include an elastomeric midblock portion B and a thermoplastic endblock portion A. The block copolymers may also be thermoplastic in the sense that they can be melted, formed, and resolidified several times with little or no change in physical properties (assuming a minimum of oxidative degradation). Alternatively, the elastomeric film can be made of a polymer that is not thermally processable, such as LYCRA® spandex, available from E. I. Du Pont de Nemours Co., or cross-linked natural rubber in film or fiber form. Thermoset polymers and polymers such as spandex, unlike the thermoplastic polymers, once cross-linked cannot be thermally processed, but can be obtained on a spool or other form and can be stretched and applied as strands in the same manner as thermoplastic polymers. As another alternative, the elastomeric film can be made of a thermoset polymer, such as AFFINITY, available from Dow Chemical Co., that can be processed like a thermoplastic, i.e. stretched and applied, and then treated with radiation, such as electron beam radiation, gamma radiation, or UV radiation to cross-link the polymer, or use polymers that have functionality built into them such that they can be moisture-cured to cross-link the polymer, thus resulting in a polymer and the enhanced mechanical properties of a thermoset.

Endblock portion A may include a poly(vinylarene), such as polystyrene. Midblock portion B may include a substantially amorphous polyolefin such as polyisoprene, ethylene/propylene polymers, ethylene/butylenes polymers, polybutadiene, and the like, or mixtures thereof.

Suitable block copolymers useful in this invention include at least two substantially polystyrene endblock portions and at least one substantially ethylene/butylene mid-block portion. A commercially available example of such a linear block copolymer is available from Kraton Polymers under the trade designation KRATON G1657 elastomeric resin. Another suitable elastomer is KRATON G2760.

The elastomeric film 46 may also be a multilayer material in that it may include two or more individual coherent webs or films. Additionally, the elastomeric film may be a multi-layer material in which one or more of the layers contain a mixture of elastic or extendable fibers or particulates.

Cross-machine directional properties of the film 46 can be enhanced by giving the formed film a cross-machine directional stretch prior to laminating the film to the necked nonwoven web. A cross-machine directional stretch can be carried out using a tenter frame, grooved rolls, or any other technique known to those skilled in the art. Another suitable method for obtaining a cross-machine directional stretch of the film is to use a blown film process that would produce a film with inherently better cross-machine directional properties compared to conventionally extruded films. The improved elastic properties and increased modulus of a blown film allows for a reduction in film basis weight and, consequently, significant cost savings.

In another embodiment of the method of the invention, the elastomeric film 46 can be stretched in the machine direction prior to lamination to the necked nonwoven web 26. The resulting necked-bonded laminate 20 would be a multi-direction stretch laminate having stretchability in both the machine direction and the cross-machine direction as taught in U.S. Pat. No. 5,114,781 issued to Morman on May 26, 1992, and U.S. Pat. No. 5,116,662 issued to Morman on May 19, 1992. In yet another embodiment, a multi-direction stretch laminate could also be obtained by creping the necked nonwoven web prior to lamination to the elastomeric film.

Conventional drive means and other conventional devices which may be utilized in conjunction with the apparatus of FIGS. 1–4 are will known and, for purposes of clarity, have not been illustrated in FIGS. 1–4.

The relation between the original dimensions of the nonwoven web 26 to its dimensions after necking determines the approximate limits of stretch of the resulting necked-bonded laminate. Because the nonwoven web is able to extend and return to its pre-necked dimensions in directions such as, for example, the machine direction or the cross-machine direction, the resulting necked-bonded laminate will be stretchable in generally the same direction as the necked nonwoven web.

Figure 5:
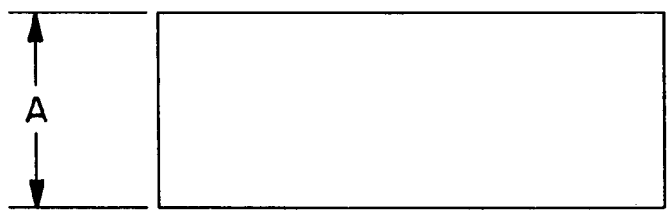
FIG. 5 is a plan view of a neckable nonwoven web before tensioning and necking.
Figure 6:
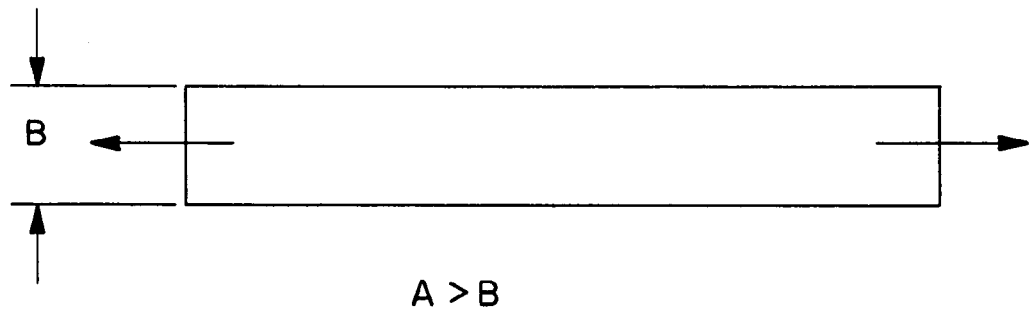
FIG. 6 is a plan view of a necked nonwoven web.
Figure 7:
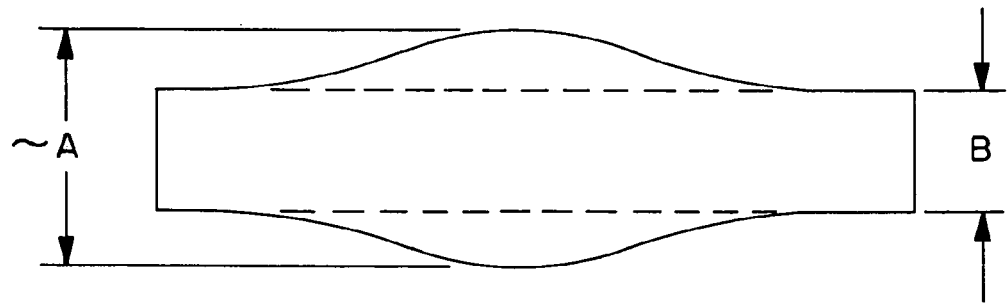
FIG. 7 is a plan view of a necked-bonded laminate while partially stretched.

For example, with reference to FIGS. 5–7, if it is desired to prepare a necked-bonded laminate stretchable to a 150% elongation, a width of nonwoven web shown schematically and not necessarily to scale in FIG. 5 having a width "A" such as, for example 250 centimeters (cm) is tensioned so that it necks down to a width "B" of about 100 cm. The necked material shown in FIG. 6 is then joined to an elastomeric film (not shown) having a width of approximately 100 cm and which is at least stretchable to a width of 250 cm. The resulting necked-bonded material shown schematically and not necessarily to scale in FIG. 7 has a width "B" of about 100 cm and is stretchable to at least the original 250 cm width "A" of the nonwoven web for an elongation of about 150%. The elastic limit of the elastomeric film needs only to be as great as the minimum desired elastic limit of the resulting necked-bonded material.

As explained above, freshly made nonwovens are easier to neck compared to nonwovens that have been aged. Therefore, the resulting necked-bonded laminates of the invention can be stretched by more than 300%. Suitably, the laminates can be stretched by about 50% to about 400%, or by about 100% to about 300%, or by about 150% to about 250%. The resulting laminates can be post-treated to improve the material properties by, for example, tentering, grooved roll process, and/or aperturing.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A one-step, one-location method of making a necked-bonded laminate, comprising:
   bonding a first plurality of filaments in a first bonding device operating at a first speed to form a first nonwoven web; necking the first nonwoven web; and feeding the first nonwoven web into a laminator operating at a second faster speed in a tensioned, necked condition, such that the first nonwoven web is conveyed from the first bonding device to the laminator within 24 seconds; and
   laminating an elastomeric film to the necked first nonwoven web in the laminator;
   wherein a difference between the first speed and the second speed necks the first nonwoven web before the first nonwoven web reaches 75% of a final crystallization and the neck-bonded laminate can be stretched by about 300% or more.

2. The method of claim 1, wherein the first nonwoven web is conveyed from the first bonding device to the laminator within 18 seconds.

3. The method of claim 1, wherein the first nonwoven web is conveyed from the first bonding device to the laminator within 12 seconds.

4. The method of claim 1, further comprising conveying the first nonwoven web to a first heating device prior to feeding the first nonwoven web into the laminator.

5. The method of claim 4, further comprising necking the first nonwoven web in the first heating device.

6. The method of claim 1, further comprising stretching the elastomeric film and laminating the elastomeric film to the first nonwoven web while the elastomeric film is in a stretched position.

7. The method of claim 1, further comprising creping the first nonwoven web after necking the first nonwoven web.

8. The method of claim 1, wherein the first nonwoven web comprises a spunbond web.

9. The method of claim 1, wherein the first nonwoven web comprises a meltblown web.

10. The method of claim 1, further comprising:
    bonding a second plurality of filaments in a second bonding device to form a second nonwoven web; necking the second nonwoven web; and feeding the second nonwoven web into the laminator, such that the second nonwoven web is conveyed from the second bonding device to the laminator within 24 seconds; and
    laminating the elastomeric film between the first nonwoven web and the second nonwoven web within the laminator.

11. The method of claim 10, wherein the second nonwoven web is conveyed from the second bonding device to the laminator within 18 seconds.

12. The method of claim 10, wherein the second nonwoven web is conveyed from the second bonding device to the laminator within 12 seconds.

13. The method of claim 10, further comprising conveying the second nonwoven web to a second heating device prior to feeding the second nonwoven web into the laminator.

14. The method of claim 13, further comprising necking the second nonwoven web in the second heating device.

15. The method of claim 10, wherein the second nonwoven web comprises a spunbond web.

16. The method of claim 10, wherein the second nonwoven web comprises a meltblown web.

17. The method of claim 1, further comprising slitting the first nonwoven web into two separate nonwoven web portions; necking both of the nonwoven web portions; feeding both nonwoven web portions into the laminator; and laminating the elastomeric film between the two nonwoven web portions within the laminator.

18. The method of claim 10, wherein the first and second nonwoven webs have different widths prior to necking, and are necked different amounts than one another to end up with the same width as one another after necking.

19. The method of claim 1, wherein the necking occurs before the first nonwoven web reaches a half-life of final crystallization.

20. A one-step, one-location method of making a necked-bonded laminate, comprising:
bonding a first plurality of filaments in a first bonding device operating at a first speed to form a first nonwoven web; necking the first nonwoven web; and feeding the first nonwoven web into a laminator operating at a second faster speed in a tensioned, necked condition, such that the first nonwoven web is conveyed from the first bonding device to the laminator within 24 seconds;
forming an elastomeric film, and feeding the elastomeric film into the laminator; and
laminating the elastomeric film to the necked first nonwoven web in the laminator;
wherein a difference between the first speed and the second speed necks the first nonwoven web before the first nonwoven web reaches 75% of a final crystallization and the necked-bonded laminate can be stretched by about 300% or more.

21. The method of claim 20, wherein the first nonwoven web is conveyed from the first bonding device to the laminator within 18 seconds.

22. The method of claim 20, wherein the first nonwoven web is conveyed from the first bonding device to the laminator within 12 seconds.

23. The method of claim 20, further comprising conveying the first nonwoven web to a first heating device prior to feeding the first nonwoven web into the laminator.

24. The method of claim 23, further comprising necking the first nonwoven web in the first heating device.

25. The method of claim 20, further comprising stretching the elastomeric film and laminating the elastomeric film to the first nonwoven web while the elastomeric film is in a stretched position.

26. The method of claim 20, further comprising creping the first nonwoven web after necking the first nonwoven web.

27. The method of claim 20, wherein the first nonwoven web comprises a spunbond web.

28. The method of claim 20, wherein the first nonwoven web comprises a meltblown web.

29. The method of claim 20, further comprising:
bonding a second plurality of filaments in a second bonding device to form a second nonwoven web; necking the second nonwoven web; and feeding the second nonwoven web into the laminator, such that the second nonwoven web is conveyed from the second bonding device to the laminator within 24 seconds; and
laminating the elastomeric film between the first nonwoven web and the second nonwoven web within the laminator.

30. The method of claim 29, wherein the second nonwoven web is conveyed from the second bonding device to the laminator within 18 seconds.

31. The method of claim 29, wherein the second nonwoven web is conveyed from the second bonding device to the laminator within 12 seconds.

32. The method of claim 29, further comprising conveying the second nonwoven web to a second heating device prior to feeding the second nonwoven web into the laminator.

33. The method of claim 32, further comprising necking the second nonwoven web in the second heating device.

34. The method of claim 29, wherein the second nonwoven web comprises a spunbond web.

35. The method of claim 29, wherein the second nonwoven web comprises a meltblown web.

36. The method of claim 20, further comprising slitting the first nonwoven web into two separate nonwoven web portions; necking both of the nonwoven web portions; feeding both nonwoven web portions into the laminator; and laminating the elastomeric film between the two nonwoven web portions within the laminator.

37. The method of claim 29, wherein the first and second nonwoven webs have different widths prior to necking, and are necked different amounts than one another to end up with the same width as one another after necking.

38. The method of claim 20, wherein the necking occurs before the first nonwoven web reaches a half-life of final crystallization.

* * * * *